Feb. 21, 1956          A. C. HOINESS          2,735,548

SIFTER DEVICE

Filed Oct. 18, 1954

INVENTOR

ALICE C. HOINESS

BY Thomas F. Healy

ATTORNEY

United States Patent Office 2,735,548
Patented Feb. 21, 1956

2,735,548

SIFTER DEVICE

Alice C. Hoiness, Billings, Mont.

Application October 18, 1954, Serial No. 462,762

3 Claims. (Cl. 209—283)

The present invention relates to a sifter device and more particularly to a sifter for flour, cake mix, or the like.

This application is a continuation-in-part of my application Serial No. 311,022 filed on September 23, 1952, now abandoned.

An object of the present invention is to provide a sifter device constructed and designed to be used in combination with a throw away carton of cake flour, cake mix, or the like.

A further object of the present invention is to provide a cake flour sifter which when used in combination with a cardboard carton of flour results in a composite flour dispensing assembly which is easy to operate, prevents flour spilling, and renders the cake flour of the proper fineness for immediate use in making a cake, or the like.

Yet another object of the present invention is to provide a dispensing attachment for containers which is provided with lock means to removably lock said attachment to a cardboard carton of cake flour in such a manner that the flour can be processed through the dispensing attachment without spilling the flour as it leaves an opening in the flour carton.

Still another object of the present invention is to provide a sifter device for use with a container comprising, a hollow tubular element open at both ends, a rotatable agitator element rotatably carried in said tubular element, and exteriorly disposed handle for manually rotating said agitator element, said rotatable agitator element including a plurality of spaced apart axially extending rods, a curved screen mounted in said tubular element, said rods of said rotatable agitator element being adapted to pass near said screen in the rotation of said agitator, a non-spill flange exteriorly carried by said tubular element, and means carried by said tubular element for cooperation with said non-spill flange to lock said flange in contact with a portion of said container.

A further object of the present invention is to provide a sifter device for use with a container comprising, a hollow tubular element open at both ends, an agitator and screen cooperatively carried within said tubular element, manual means for operating said agitator, a non-spill flange exteriorly carried by said tubular element, and means carried by said tubular element for cooperation with said non-spill flange to lock said flange in contact with a portion of said container.

Yet another object of the present invention is to provide a dispensing and sifter attachment for throw away cardboard cartons containing cake flour or the like, comprising, a hollow tubular element shaped for partial insertion into an opening in said carton with said carton being otherwise closed, an agitator and screen cooperatively carried within said tubular element, manual means for operating said agitator, means exteriorly carried by said tubular element for preventing undesired flour from spilling from said carton at said opening, and means carried by said tubular element for cooperation with said first mentioned means to lock said first mentioned means in contact with a portion of said carton around the opening therein.

Other and further objects and advantages of the present invention will be apparent from the following description thereof and from the claims appended thereto.

In the drawing, wherein like numerals refer to like or corresponding parts throughout the several views.

Figure 1:
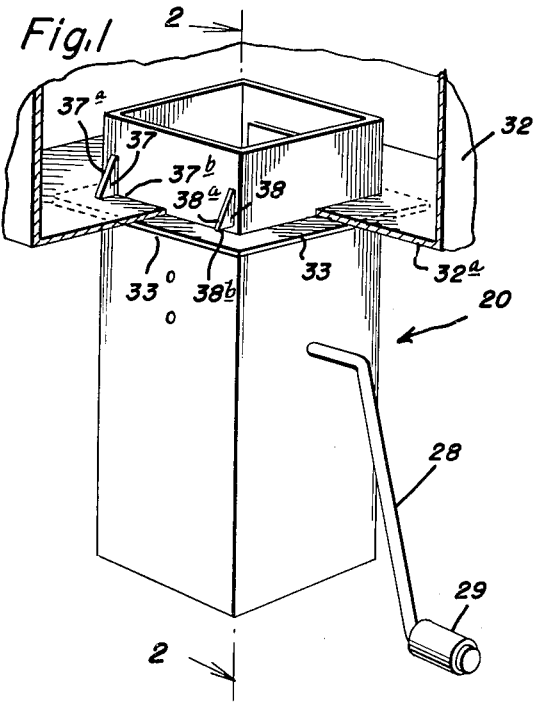
Figure 1 is a perspective view of the sifter device embodying the features of the present invention and shown in combination with a carton, which is partly in section and with parts broken away.

Referring now to the drawing, there is generally indicated the sifting device comprising the present invention and embodying the features thereof. The sifter device is primarily adapted for sifting flour, cake mix, or the like, where fineness and texture is important in providing a good end product.

The sifter device may be made of any desired shape, but preferably comprises a four-sided body portion which has been generally indicated by the numeral 20.

A rotatable agitator element is rotatably carried within the four-sided tubular element 20 and comprises a circular disk 21, a second circular disk 22, an axially extending central rod 23 which is secured at one end thereof to disk 21 and at the other end thereof to disk 22 so that disks 21 and 22 move as a unit. The agitator element also includes a plurality of rods 24 which are spaced apart from each other and secured at opposite ends thereof to the marginal circumferential portion of circular disks 21 and 22. The tubular element or member 20 is apertured in a wall thereof as at 25 to receive a pivot pin 26 which rotates therein, which pivot pin 26 is secured to the central portion of circular disk 22 so as to rotatably support said disk 22 within tubular member 20. The tubular member 20 is additionally apertured at 27, which aperture 27 is oppositely disposed from aperture 25. The end portion of the crank arm 28 is welded or otherwise secured to the central portion of disk 21 so that the agitator element is rotatably carried within tubular element 20, being supported by pivot pin 26 and the end portion of crank arm 28. The crank arm 28 is provided on the outer end thereof with finger piece 29 which facilitates cranking movement thereof.

Figure 2:
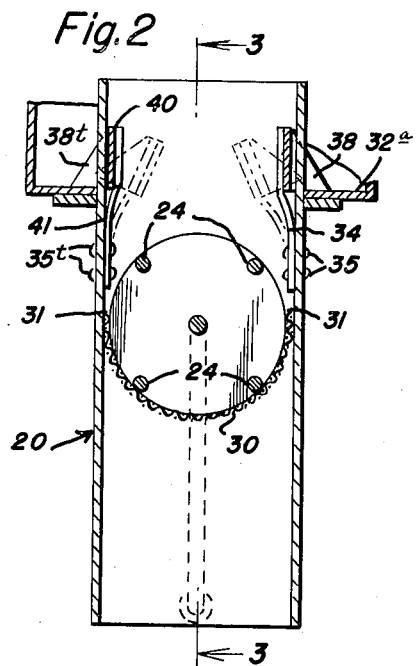
Figure 2 is a sectional view taken along the line 2—2 of Figure 1 in the direction of the arrows.
Figure 3:
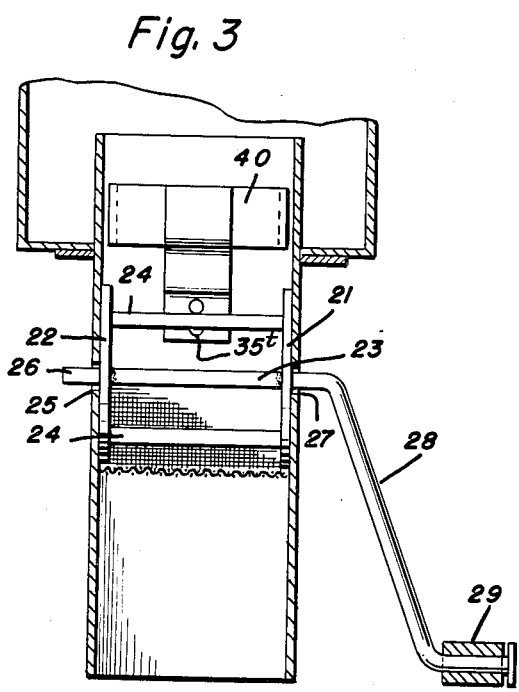
Figure 3 is a sectional view taken along the line 3—3 of Figure 2 in the direction of the arrows.
Figure 4:
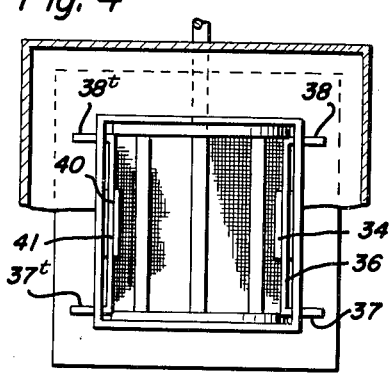
Figure 4 is a top plan of the sifter device with a part of the container carton being shown.

As best shown in Figure 2 of the drawing, a curved or semicylindrical screen 30 is carried within said tubular element 20, being welded or otherwise secured to the inner walls of said tubular element 20 as at 31. The curved screen 30 is cooperatively carried or positioned with reference to the agitator element so that the plurality of rods 24, when the agitator element is rotated, slightly contact the surface of screen 30 so that the flour, or other mix being processed, is finely textured. Such a close engagement of rods 24 and the screen 30 is important as it brings about a finer flour or cake mix which is particularly adaptable for the ready making of cakes and eliminates the necessity of double or triple sifting. While it is not actually necessary that the rods 24 actually touch the surface of the screen 30 during the rotation of the agitator element and the processing of the flour, it is preferred, as indicated, but it is important that there be such a cooperation between the rods 24 and the surface of the screen 30 so as to finely texture the flour, or other mix.

As best shown in Figure 1 of the drawing, the sifter device embodying the features of the present invention is constructed and designed for use in combination with a throw away carton 32 which contains cake flour, cake mix, or the like. The carton 32 is preferably made of cardboard, and has the usual rectangular structure of containers of this type which are sold on the market.

When it is desired to use the cardboard carton of flour 32, the top portion 32a is apertured to form an opening substantially the same size as the cross sectional area of tubular element 20 which as shown is square or substantially square. The sifter device is inserted in the aperture in the top 32a of carton 32 and held in place by means of a locking mechanism which is described more fully hereinafter.

The elongated tubular element 20 carries a non-spill flange 33 which is secured to the outer surface of element 20 and extends around the outer surface thereof in one plane. The purpose of flange 33 is to provide guard or non-spill means to prevent undesired flour from seeping through the aperture in the top 32a of carton 32 during the operation of the sifter device.

The lock means for holding a portion of the top 32a of the cardboard carton 32 against the non-spill flange 33 generally comprises two oppositely disposed spring lock mechanisms which are substantially identical in structure. One of said pair of lock mechanisms includes a spring strip 34 which is anchored at one end thereof to the inner surface of tubular element 20 by rivets 35, said strip 34 extending along the inner surface of element 20 generally in a vertical axial direction. A cross metal strip 36 is centrally secured, as by welding, to the free end portion of flexible strip 34. Cross strip 36 is bent at each end portion thereof to provide fingers 37 and 38 which normally extend through a suitable slot in tube 20. There are two spaced apart slots, one adapted to receive finger 37 and the other adapted to receive finger 38, and said fingers 37 and 38 may be moved inwardly toward the interior of tube 20 against the spring of strip 34.

Finger 37 is shaped substantially like a right triangle and has a slanting edge 37a terminating short of the upper surface of flange 33, and a straight edge 37b. Edge 37a extends downwardly and outwardly from the outer surface of tube 20 and edge 37b extends inwardly toward the outer surface of tube 20 from the terminal point of edge 37a.

Likewise, finger 38, which is the same shape as finger 37, has a slant edge 38a and a straight edge 38b.

The lock means also may include a second pair of fingers 37T and 38T which are substantially identical in shape and size with fingers 37 and 38. Fingers 37T and 38T extend at right angles from spring cross arm 40 which is centrally welded to a springy leg 41 which in turn is secured to the inner wall of tube 20 by rivets 35T.

In operation, the pairs of fingers 37—38 and 37T—38T normally extend through the pairs of slots in tube 20. When it is desired to use the sifter with a carton 32 of flour or the like, the top 32a is first apertured and a portion of tube 20 is inserted in this opening in top 32a. A part of the edge portion of top 32a which extends around the said opening therein contacts the slant edge of each of fingers 37—38 and 37T—38T, and with further pressure rides over the slant edges of said fingers to push said fingers inwardly against the bias of the spring. As the top 32a contacts the flange 33 the fingers 37—38 and 37T—38T will spring back into normal position and lock a portion of top 32a between the pairs of fingers and the non-spill flange 33. The sifter device may then be used without spilling flour from the carton, as only the desired amount of flour reaches the sifter screen.

Rotation of crank arm 28 will sift the flour through screen 30 into a cup or other container.

Various modifications may be made in this invention without departing from the spirit thereof, and it is therefore desired to be limited only by the scope of the appended claims.

What is claimed is:

1. A sifter device for use with a cardboard carton of flour, or the like comprising, a hollow tubular element open at both ends, a rotatable agitator element rotatably carried in said tubular element, an exteriorly disposed handle for manually rotating said agitator element, said rotatable agitator element including a plurality of spaced apart axially extending rods, a curved screen mounted in said tubular element on one side of said agitator element, said rods of said rotatable agitator element being adapted to lightly engage said screen in the rotation of said agitator, a non-spill flange exteriorly carried by said tubular element and extending around the outer surface thereof, said exterior non-spill flange being disposed on the other side of said agitator element with reference to said interiorly positioned curved screen, said tubular element being slotted intermediate the said non-spill flange and an open end of said tubular element to provide two pairs of oppositely disposed slots, each of said slots in each pair of slots being spaced apart from the other of said slots in the pair, a spring element for each pair of slots mounted within said tubular element on the interior surface thereof, each of said spring elements including two spaced apart fingers each projecting through each of said slots and each being adapted to be moved toward the interior of said tubular element against the bias of the spring element, each of said fingers having an edge slanting outwardly and downwardly from the exterior surface of said tubular element when said finger is in normal position to terminate short of the surface of said non-spill flange, each of said fingers having an edge extending inwardly from said terminal point toward the outer surface of said tubular element to provide a clearance between said inwardly extending edge and the surface of said non-spill flange to snugly receive a portion of the top of the carton.

2. A sifter device for use with a cardboard carton of flour, or the like comprising, a four sided hollow tubular element open at both ends, a rotatable agitator element rotatably carried in said tubular element, an exteriorly disposed handle for manually rotating said agitator element, said rotatable agitator element including a pair of circular disks, joined together by a centrally disposed axially extending rod and a plurality of circumferentially disposed spaced apart axially extending rods, a curved screen mounted in said tubular element on one side of said agitator element, said rods of said rotatable agitator element being adapted to lightly engage said screen in the rotation of said agitator, a non-spill flange exteriorly carried by said tubular element and extending around the outer surface thereof, said exterior non-spill flange being disposed on the other side of said agitator element with reference to said interiorly positioned curved screen, said tubular element being slotted intermediate the said non-spill flange and an open end of said tubular element to provide two pairs of oppositely disposed slots, each of said slots in each pair of slots being spaced apart from the other of said slots in the pair, a spring element for each pair of slots mounted within said tubular element on the interior surface thereof, each of said spring elements including two spaced apart fingers each projecting through each of said slots and each being adapted to be moved toward the interior of said tubular element against the bias of the spring element, each of said fingers having an edge slanting outwardly and downwardly from the exterior surface of said tubular element when said finger is in normal position to terminate short of the surface of said non-spill flange, each of said fingers having an edge extending inwardly from said terminal point toward the outer surface of said tubular element to provide a clearance between said inwardly extending edge and the surface of said non-spill flange to snugly receive a portion of the top of the carton.

3. A sifter device for use with a cardboard carton of flour, or the like comprising, a hollow tubular element open at both ends, a rotatable agitator element rotatably carried in said tubular element, an exteriorly disposed handle for manually rotating said agitator element, said rotatable agitator element including a plurality of spaced apart axially extending rods, a curved screen mounted in said tubular element on one side of said agitator element in proximity to said agitator element so that in operation said rods almost touch said screen, a non-spill flange exteriorly carried by said tubular element and extending around the outer surface thereof, said exterior non-spill flange being disposed on the other side of said agitator element with reference to said interiorly positioned curved screen, said tubular element being slotted intermediate the said non-spill flange and an open end of said tubular element to provide two pairs of oppositely disposed slots, each of said slots in each pair of slots being spaced apart from the other of said slots in the pair, a spring element for each pair of slots mounted within said tubular element on the interior surface thereof, each of said spring elements including two spaced apart fingers each projecting through each of said slots and each being adapted to be moved toward the interior of said tubular element against the bias of the spring element, each of said fingers having an edge slanting outwardly and downwardly from the exterior surface of said tubular element when said finger is in normal position to terminate short of the surface of said non-spill flange, each of said fingers having an edge extending inwardly from said terminal point toward the outer surface of said tubular element to provide a clearance between said inwardly extending edge and the surface of said non-spill flange to snugly receive a portion of the top of the carton.

References Cited in the file of this patent
UNITED STATES PATENTS
1,806,159     Goldberg _____ May 19, 1931